United States Patent
Lee et al.

(10) Patent No.: US 9,168,817 B2
(45) Date of Patent: Oct. 27, 2015

(54) STRUCTURE OF FOLDING TYPE SUNROOF DEFLECTOR

(71) Applicants: Hyundai Motor Company, Seoul (KR); Inalfa Roof Systems Group B.V., AB Venray (NL)

(72) Inventors: Jeong-Min Lee, Busan-shi (KR); Hwa-Kyoung Sung, Hwasung-shi (KR)

(73) Assignees: HYUNDAI MOTOR COMPANY, Seoul (KR); INALFA ROOF SYSTEMS GROUP B.V., AB Venray (NL)

( * ) Notice: Subject to any disclaimer, the term of this patent is extended or adjusted under 35 U.S.C. 154(b) by 0 days.

(21) Appl. No.: 14/509,994

(22) Filed: Oct. 8, 2014

(65) Prior Publication Data

US 2015/0151620 A1    Jun. 4, 2015

(30) Foreign Application Priority Data

Dec. 4, 2013 (KR) .......................... 10-2013-149845

(51) Int. Cl.
  *B60J 7/22* (2006.01)
  *B60J 7/043* (2006.01)

(52) U.S. Cl.
  CPC ... *B60J 7/22* (2013.01); *B60J 7/043* (2013.01)

(58) Field of Classification Search
  CPC .................................... B60J 7/22; B60J 7/223
  USPC ........................................................ 296/217
  See application file for complete search history.

(56) References Cited

U.S. PATENT DOCUMENTS

| 3,922,032 | A | | 11/1975 | Schaller |
| 4,291,912 | A | | 9/1981 | Fox et al. |
| 5,052,745 | A | * | 10/1991 | Preiss ........................... 296/217 |
| 6,286,899 | B1 | | 9/2001 | Hirschvogel et al. |
| 8,388,052 | B2 | * | 3/2013 | Sawada et al. ................ 296/217 |

FOREIGN PATENT DOCUMENTS

| JP | 63-72227 U | 5/1988 |
| JP | 2005-289310 A | 10/2005 |

* cited by examiner

*Primary Examiner* — Dennis H Pedder
(74) *Attorney, Agent, or Firm* — Morgan, Lewis & Bockius LLP

(57) ABSTRACT

A folding type sunroof deflector structure may include a deflector gate formed penetrating the front frame in the width-wise direction of the vehicle a first deflector which is stored inside the front frame to be moved up and down through the deflector gate and projectable outside of the opening section; a second deflector, an upper part of which is rotatably connected to a hinge joint located at a bottom of the first deflector and which is projectable outside of the opening section according to a movement of the first deflector; and a pair of deflector arms having a rear end portion of which is rotatably coupled to a pair of side frames to be connected to sides of the opening section; and a front end portion of which is coupled to both sides of the first deflector to move the first deflector up and down.

6 Claims, 4 Drawing Sheets

STRUCTURE OF FOLDING TYPE SUNROOF DEFLECTOR

CROSS-REFERENCE TO RELATED APPLICATION

The present application claims priority to Korean Patent Application No. 10-2013-149845 filed on Dec. 4, 2013, the entire contents of which is incorporated herein for all purposes by this reference.

BACKGROUND OF THE INVENTION

1. Field of the Invention

The present invention relates to a sunroof deflector structure mounted on the outer side of a ceiling weather strip of a vehicle. more specifically, to a folding type sunroof deflector structure including a first deflector configured to move upwards and downwards through a deflector gate formed on a front frame and a second deflector connected in a rotatable manner at a hinge joint located on the bottom end of the first deflector whereby the second deflector together with the first deflector may be stored in a folded state by device of the hinge joint when stored inside the front frame.

2. Description of Related Art

Generally, an opening portion may be formed on the roof panel of the vehicle for discharging indoor air into the outside of the vehicle and introducing outside air into the interior of the vehicle wherein the opening portion can be opened and closed by the sunroof glass installed on the roof of the vehicle.

In particular, recently, most of roof panels are replaced with glass for a clear sense of opening and a remarkable aesthetic sense wherein a panoramic sunroof type is mainly used in which a portion of the sunroofs is opened and closed selectively.

With such a panoramic sunroof, the driver may receive natural sunlight during driving and stopping of the vehicle as well as may feel cool driving comfort by opening the panoramic sunroof during the driving of the vehicle.

Generally, on the front of the opening portion of the above mentioned roof panel, a sunroof deflector serving the function of altering the direction of the driving wind upwards is installed for preventing driving wind from entering inside the vehicle through the opening portion in the open state during driving.

This sunroof deflector primarily is operated in such manners to tilt up the sunroof deflector by using a separate electric motor or to tilt up the sunroof deflector by using the elastic force of a spring compressing the sunroof deflector when the sunroof glass is opened.

Also, this sunroof deflector is classified as a sealing weather strip exterior type deflector positioned inside of the rainwater drainage section formed outside of the sealing weather strip attached to the sunroof frame of the vehicle and as a sealing weather strip interior type deflector positioned inside of the sealing weather strip.

The sealing weather strip exterior type deflector has an advantage of blocking drone noise by rapidly elevating when opening of the sunroof glass, and in the sense of the opening length of the sunroof glass over the sealing weather strip interior type deflector.

As shown in FIG. 1, according to a conventional sunroof deflector structure arranged outside of the sealing weather strip, a fabric type deflector 4 is stored in the inside of the rainwater drainage section 3 installed in the front of the sealing weather strip 2 attached to the sunroof frame 1 of the vehicle wherein a bottom of the deflector 4 is coupled to a fixing plate 5 and the deflector beam 6 is coupled to the top of the deflector 4.

However, as shown in FIG. 2, according to a conventional sunroof deflector structure, the deflector 4 is stored in the rainwater drainage section 3 arranged outside of the sealing weather strip 2, thus is frozen and adhered while the fabric type deflector 4 is folded due to introduction of moisture and cold weather. Accordingly, the deflector 4 is not tilted up properly.

Furthermore, when a hard type deflector is used instead of a fabric type deflector to solve the above problem, a low profiled deflector needs to be installed due to the limitation of the storage space of the sunroof frame, and correspondingly, the drone noise is increased, which is caused from cavity resonance generated between interior air of the vehicle and air vibration at the low frequency band region, passing along the opening section of the sunroof during low speed or middle speed driving of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a folding type sunroof deflector structure, wherein the sunroof deflector has a multi-stage configuration configured to be stored in a folded state when it is stored in the sunroof frame, which resolves the freezing problem of the sunroof deflector caused by the inflow of moisture and at the same time reduces the occurrence of drone noise caused by height limitation of the hard-type deflector while retaining the advantages of a ceiling weather strip external type deflector.

In an aspect of the present invention, a folding type sunroof deflector structure positioned in a ceiling section of a vehicle and coupled in a widthwise direction of the vehicle to a front of an opening section which is selectively opened and closed by a sunroof glass, and stored in a front frame, may include a deflector gate formed penetrating the front frame in the widthwise direction of the vehicle between a rainwater drainage section formed in the front frame and a ceiling weather strip, a first deflector which is stored inside the front frame to be moved up and down through the deflector gate and projectable outside of the opening section, a second deflector, an upper part of which is rotatably connected to a hinge joint located at a bottom of the first deflector and which is projectable outside of the opening section according to a movement of the first deflector, and a pair of deflector arms having a rear end portion of which is rotatably coupled to a pair of side frames to be connected to sides of the opening section, and a front end portion of which is coupled to both sides of the first deflector to move the first deflector up and down, wherein the second deflector is stored in a folded manner by the hinge joint when the second deflector is stored inside the front frame together with the first deflector.

The folding type sunroof deflector structure may further include a pair of guide bodies coupled to the pair of side frames, respectively, a guide hole formed through sides of the guide bodies in a forward and backward direction, and a slider coupled to a lower end of the second deflector and accommodated in the guide hole to be slid, wherein the second deflector is folded toward the first deflector as the slider slides in a rearward direction along the guide hole.

An end of the guide hole is curved smoothly upward in an 'L'-shape configuration.

Te folding type sunroof deflector structure may further include a deflector weather strip which is coupled in the widthwise direction of the vehicle to a tip of the front frame positioned at front of the first deflector and the second deflector, thereby preventing a wind from entering in between the front frame and the first deflector and the second deflector.

The folding type sunroof deflector structure may further include a plurality of deflector holes being formed through the first deflector in a horizontal direction, thereby minimizing wind noise generated during a high speed driving.

The first deflector and the second deflector are hard-type deflectors formed from one of plastic, steel, and aluminum.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
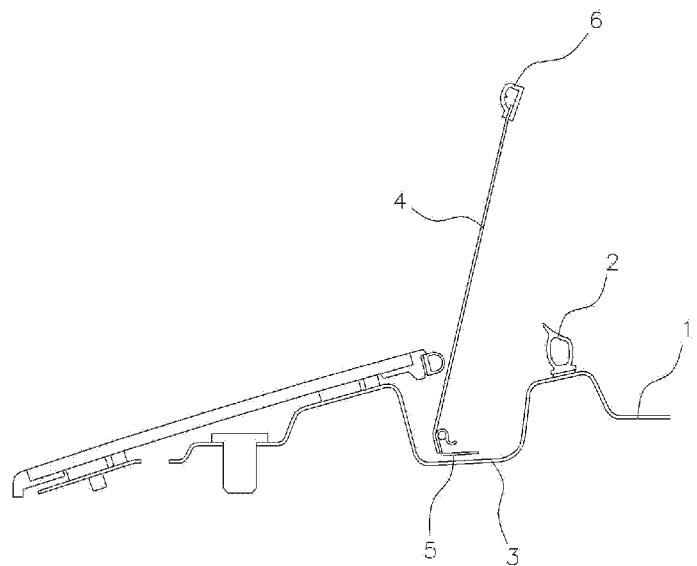
FIG. 1 is a sectional view of a conventional sunroof deflector structure wherein the sunroof deflector is projected to the outside of the opening portion.

It should be understood that the accompanying drawings are not necessarily to scale, presenting a somewhat simplified representation of various exemplary features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the inventions(s) will be described in conjunction with exemplary embodiments, it will be understood that the present description is not intended to limit the invention(s) to those exemplary embodiments. On the contrary, the invention(s) is/are intended to cover the exemplary embodiments as well as various alternatives, modifications, equivalents, and other embodiments, which may be included within the spirit and scope of the invention as defined by the accompanying claims.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a folding type sunroof deflector structure for a vehicle is described with reference to the accompanying drawings according to an exemplary embodiment of the invention.

A folding type sunroof deflector according to an exemplary embodiment of the present invention, which is positioned in a ceiling section of a vehicle and stored in a front frame 20 coupled in the widthwise direction of the vehicle to the front of an opening portion 12 which is configured to be opened and closed through a sunroof glass 10, includes, a deflector gate 22 formed penetrating the front frame 20 in the widthwise direction of the vehicle between a rainwater drainage section 16 formed in the front frame 20 and a sealing weather strip 14, a first deflector 30 stored inside the front frame 20 to be movable vertically through the deflector gate 22 and projectable outside the opening portion 12, a second deflector 40, the upper end of which is connected in a rotatable manner to the hinge joint 50 located at the bottom of the first deflector 30 and which is projectable outside of the opening portion 12 according to the movement of the first deflector 30, and a pair of deflector arms 60 which is connected in a rotatable manner to a pair of side frames 26, rear ends of which are connected to the sides of the opening portion 12 and the front ends are connected to upper sides of the first deflector 30 to move the first deflector 30 vertically wherein the second deflector 40 is stored in a folded manner by the hinge joint 50 when it is stored together with the first deflector 30 inside the front frame 20.

Figure 3:
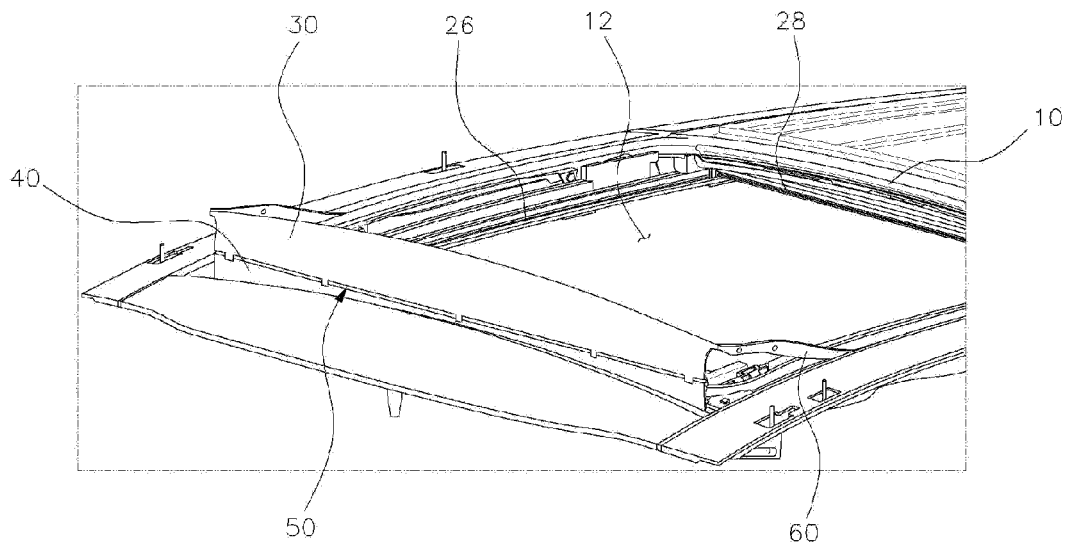
FIG. 3 is a perspective view illustrating the overall appearance of a folding type sunroof deflector structure according to an exemplary embodiment of the present invention.

As shown in FIG. 3, the opening portion 12 is formed in the ceiling section of a vehicle, which is configured to be opened or closed via the sunroof glass 10 which is movable in a forward and backward direction, to provide ventilation and a feeling of openness to the inside of the vehicle.

The sunroof glass 10 may be operable in various ways, such as sliding in the forward or backward direction of the vehicle using a driving device, for example, a motor, or tilting in an up or down direction of the vehicle. According to the folding type sunroof deflector of an exemplary embodiment of the present invention, the sunroof glass 10 is operated to be slid in a forward or backward direction of the vehicle.

The sunroof glass 10 generally includes a material which effectively blocks ultraviolet ray and infrared lights and is formed of various materials, specifically, transparent glass, opaque glass, or synthetic resin.

Figure 4:
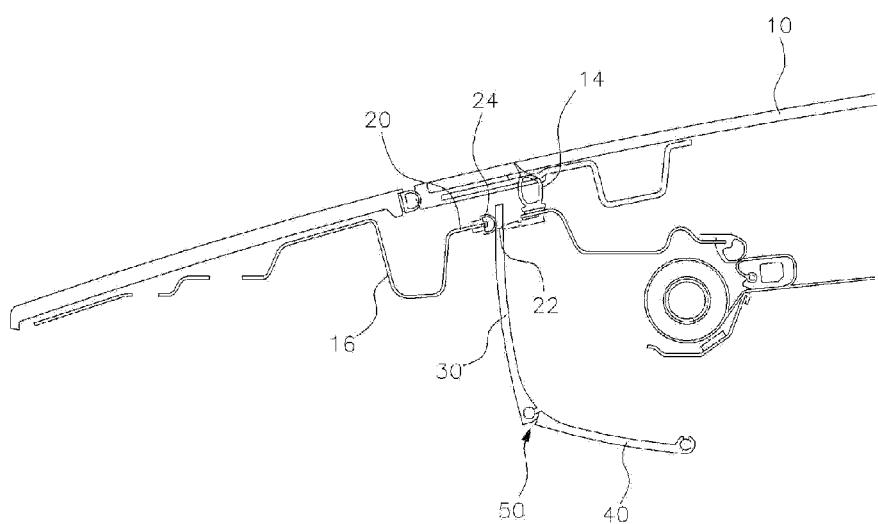
FIG. 4 is a cross-sectional view illustrating a first deflector and a second deflector stored inside the front frame according to an exemplary embodiment of the present invention.

As shown in FIGS. 3 and 4, a front frame 20 coupled to the front of the opening section 12 along a widthwise direction of the vehicle, a pair of side frames 26 coupled to the sides of the opening section 12 along a front/rear direction of the vehicle, and a rear frame 28 coupled to the rear of the opening section 12 along a widthwise direction of the vehicle are positioned along the circumference of the opening section 12 to support the sunroof glass 10.

As shown in FIG. 3, the pair of side frames 26 is each shaped as rails to allow the sunroof glass 10 to slide in the front/rear direction of the vehicle thereby enabling the opening section 12 to open and close.

As shown in FIG. 4, the rainwater drainage section 16 is arranged on the front frame 20 in the widthwise direction of the vehicle, thereby serving to provide a passage through which external water, such as rainwater entering from the outside, can be discharged.

Figure 2:
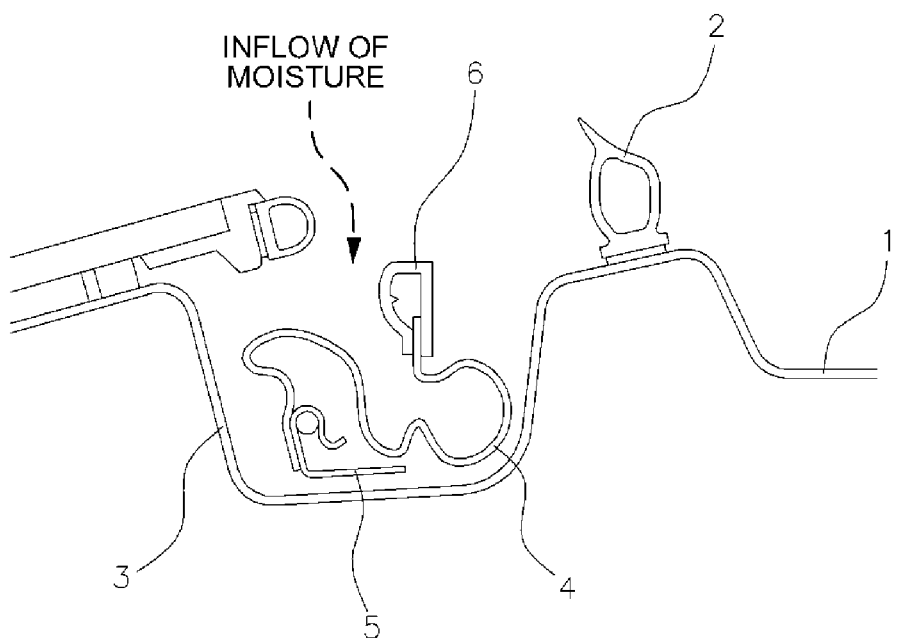
FIG. 2 is a partial cross-sectional view of a conventional sunroof deflector structure wherein the sunroof deflector is stored inside the rainwater drainage section.

As shown in FIG. 2, the rainwater drainage section 3 of a conventional sunroof deflector structure is formed in a large space so that it can serve to not only provide a passage for external water to flow, but also provide a storage space for a sunroof deflector 4.

However, as shown in FIG. 4, the size of the rainwater drainage section 16 according to an exemplary embodiment of the present invention is formed relatively smaller than the conventional rainwater drainage section 3 since the storage space for the first deflector 30 and the second deflector 40, as described below, is separate from the rainwater drainage section 16 and the rainwater drainage section 16 serves as a passage for external water to flow.

As shown in FIG. 4, a deflector gate 22 located between the rainwater drainage section 16 and the ceiling weather strip 14 of the front frame 20 is formed through the front frame 20 in the widthwise direction of the vehicle to serve as a gateway when the first deflector 30 and the second deflector 40 move up and down in a vertical direction.

As shown in FIG. 4, a ceiling weather strip 14 made of a rubber material is coupled to the front frame 20 in the widthwise direction of the vehicle at the rear of the deflector gate 22, thereby serving a role in preventing noise produced when the sunroof glass 10 is opened and preventing foreign matter from entering the interior of the vehicle.

In other words, the first deflector 30 and the second deflector 40 according to an exemplary embodiment of the present invention are stored in the front frame 20 through the deflector gate 22 positioned at the exterior of the ceiling weather strip 14, and thus can rise quickly upon opening of the sunroof glass 10 and are favorable in view of the opening length of the sunroof.

As shown in FIGS. 3 and 4, the first deflector 30 is configured to move in an up and down direction through the deflector gate 22 and is coupled at the bottom end to the hinge joint 50 in the line form of a plate.

Figure 5:
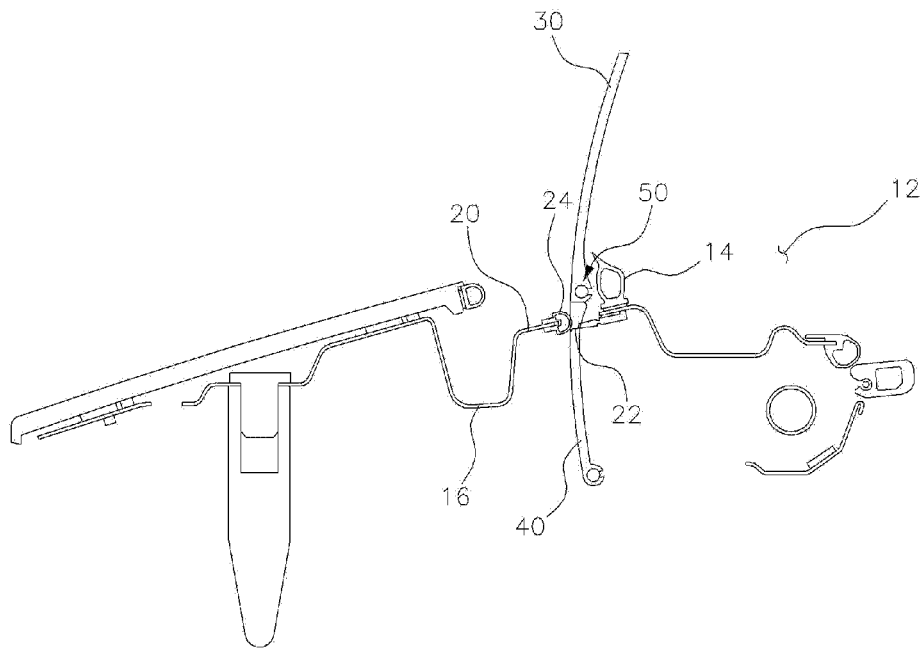
FIG. 5 is a cross-sectional view illustrating a first deflector and a second deflector protruding upward of the opening portion according to an exemplary embodiment of the present invention.

As shown in FIGS. 4 and 5, the second deflector 40 is coupled to the lower end of the first deflector 30, and the second deflector 40 rotates via the hinge joint 50 to fold in the direction of the first deflector 30 and unfolds in the opposite direction.

Figure 6:
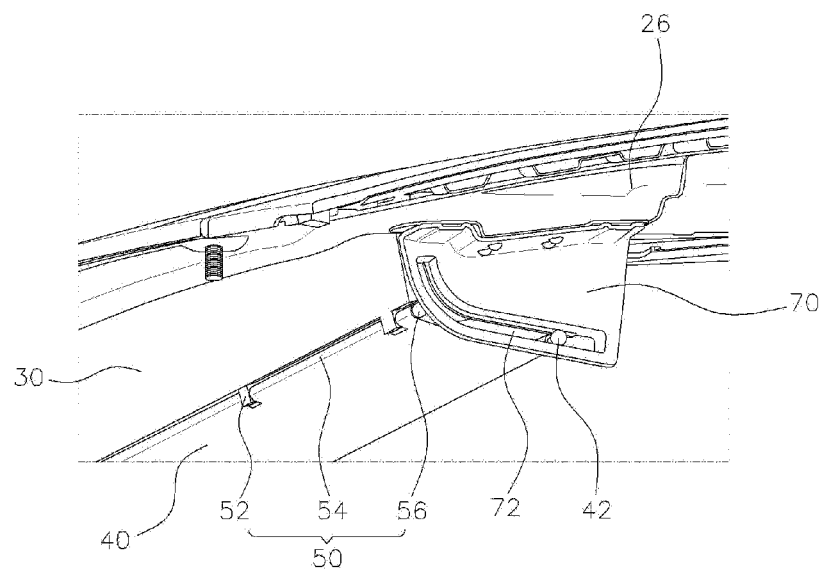
FIG. 6 is a perspective view illustrating a first deflector and a second deflector stored inside the front frame along the guide hole according to another embodiment of the present invention.

As shown in FIG. 6, the hinge joint 50, in particular, is provided with a plurality of first deflector protrusions 52 formed on the lower edge of the first deflector 30, a plurality of second deflector protrusions 54 formed on the upper edge of the second deflector 40, and a hinge shaft 56 linking both deflectors by passing through the first deflector protrusion 52 and the second deflector protrusion 54 in the widthwise direction of the vehicle.

In other words, since the hinge shaft 56 passes through and links the first deflector protrusion 52 and the second deflector protrusion 54, the second deflector 40 is configured to rotate freely in a direction toward or opposite from the first deflector 30 on the basis of the hinge shaft 56.

As shown in FIG. 3, the rear ends of the pair of deflector arms 60 are coupled, respectively, in a rotatable manner to the side frames 26 and the front ends of the deflector arms 60 are coupled, respectively, to both sides at the top of the first deflector 30 thereby to serve as moving the first deflector 30 in an up or down direction.

In other words, the upper ends of the first deflector 30 may be fixed to the pair of deflector arms 60 in order to be moved vertically in an up or down direction according to the rotation of the deflector arms 60.

The rear ends of the deflector arms 60 may be connected to a separate electric motor to be operated in a rotational manner in a clockwise or counterclockwise direction. Alternatively, the deflector arms 60 may be operated to be protruded upward under the elastic force of a spring positioned at the lower ends of the deflector arms 60 upon opening of the sunroof glass 10 and lowered downward under the compression of the sunroof glass 10 upon closing of the sunroof glass 10.

As shown in FIG. 6, the pair of side frames 26 may be each, coupled to a guide body portion 70, respectively, and a slider 42 coupled to the lower end of the second deflector 40 may be configured to slide along the guide hole 72 formed through the side of the guide body portion 70 in a forward-to-backward direction.

The guide hole 72 formed in the guide body portion 70 serves to guide the second deflector 40 to slide rearward precisely to be folded toward the first deflector 30 without being moved to any other directions when the second deflector 40 is stored in the front frame 20.

Figure 7:
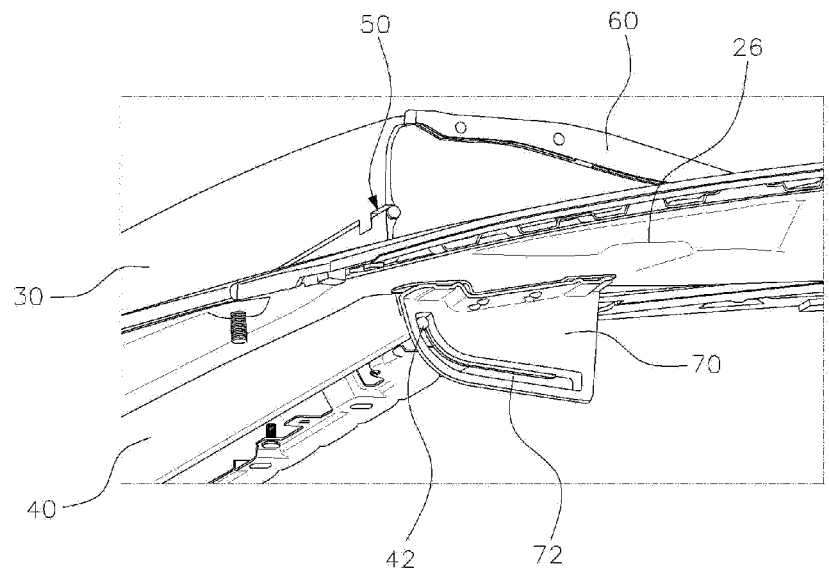
FIG. 7 is a perspective view illustrating a first deflector and a second deflector protruding upward of the opening portion along the guide hole according to another embodiment of the present invention.

As shown in FIG. 6, when the first deflector 30 and second deflector 40 are stored, the slider 42 is moved toward the rear end of the guide hole 72 to allow the second deflector 40 to be folded and, as shown in FIG. 7, when the first deflector 30 and the second deflector 40 are protruded out of the front frame 20, the slider 42 is moved to the front end of the guide hole 72 to allow the second deflector 40 to be unfolded.

The slider 42 may be made with various forms, for example, in the form of a roller accommodated in the guide hole 72 depending on the shape of the sunroof deflector, type of vehicle, and materials of the sunroof deflector, etc.

As shown in FIGS. 6 and 7, the front end of the guide hole 72 may be curved smoothly upward in the form of a rounded 'L'-shape.

In other words, the second deflector 40 is laid parallel in accordance that the slider 42 is moved along the guide hole 72 in which the slider 42 is arranged horizontally when the first deflector 30 and the second deflector 40 are stored, and the second deflector 40 is raised smoothly in a vertical direction in accordance that the slider 42 is moved along the guide hole 72 curved upward when the first deflector 30 and the second deflector 40 are protruded out of the front frame 20. As shown in FIGS. 4 and 5, the deflector weather strip 24 may coupled in the widthwise direction of the vehicle to the tip of the front frame 20 positioned in front of the first deflector 30 and the second deflector 40.

The deflector weather strip 24 may be formed of the same rubber material as the ceiling weather strip 14 and positioned to be in contact with the front surface of the first deflector 30 and the second deflector 40.

The deflector weather strip 24 serves to prevent outside wind and air from entering in between the front frame 20 and the first deflector 30 and the second deflector 40 by being in close contact with the front surfaces of the first deflector 30 and the second deflector 40.

Figure 8:
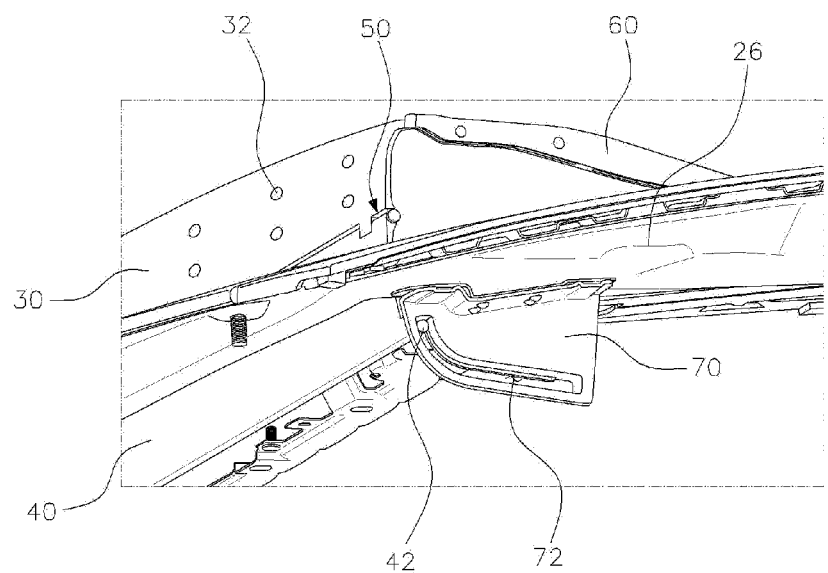
FIG. 8 is a perspective view of deflector holes formed through the first deflector according to another embodiment of the present invention.

As shown in FIG. 8, a plurality of deflector holes are formed through the first deflector 30 in a horizontal direction and can minimize wind noise generated when driving wind of the vehicle impacts the first deflector 30 protruded upward over the opening section 12 during high speed driving.

In other words, as shown in FIG. 8, as the driver adjusts the sunroof glass 10 such that only the first deflector 30 on which the deflector holes 32 are formed is protruded over the opening section 12 during high speed driving so that the air rising over the first deflector 30 and the air passing through the deflector holes 32 can counterbalance each other.

In the exemplary embodiment described above, even though the deflector holes 32 are simply shown as circles but may be formed in various shapes, such as an oval hole, a wave hole, etc., in accordance with the difference of sunroof deflector shape depending on the type of vehicle, or force of driving wind impacting the sunroof deflector.

Preferably, as shown in FIGS. 6 and 7, the first deflector 30 and the second deflector 40 may be hard-type deflectors which may be made from one of plastic, steel, or aluminum.

As described above, the first deflector 30 and the second deflector 40 are formed with a hard-type deflector, and thus can effectively raise the driving wind higher over the opening section 12 as compared to the fabric type deflector and primarily overcome the problem in which a fabric type deflector is frozen and attached in a folded state.

According to the sunroof structure in a folding type of the present invention, it can maintain the advantage of a ceiling weather strip exterior type deflector while preventing the freezing of the sunroof deflector due to the inflow of water by storing the first deflector and the second deflector inside the front frame through the deflector gate formed on the front frame separately from the rainwater drainage section.

Further, according to the sunroof structure in a folding type of the present invention, it can resolve the contamination problems of a conventional fabric type deflector and prevent the sunroof deflector from becoming stuck when the sunroof glass is closed by strong winds with designing the sunroof deflector stored separately from the rainwater drainage section and consisting the sunroof deflector not of a fabric type but rather of a hard type.

Further, according to the sunroof structure in a folding type of the present invention, it can maintain a sunroof deflector in a high position despite using a hard type deflector and thereby minimizing drone noise by overcoming the storage limitation of the front frame by designing the sunroof deflector with the first deflector and the second deflector and to be storable in the front frame in a folding manner.

Further, according to the sunroof structure in a folding type of the present invention, it can minimize the wind noise generated from the collision of driving wind at high vehicle speeds with the deflector installed on top of the roof panel opening section in a protruding shape by forming a plurality of holes through the first deflector in a horizontal direction.

Further, according to the sunroof structure in a folding type of the present invention, it can block the wind noise from being entered in between the first deflector and the second deflector and the front frame by coupling the deflector weather strip between the first deflector and the second deflector and the front frame in the widthwise direction of the vehicle. Furthermore, according to the sunroof structure in a folding type of the present invention, it can design optimum height of a sunroof deflector depending on the vehicle type, etc., by changing variably the number of deflectors and arrangement of the hinge joint including a sunroof deflector and embody a folding type sunroof deflector structure according to an exemplary embodiment of the present invention by utilizing the same layout of a conventional sunroof deflector structure.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A folding type sunroof deflector structure positioned in a ceiling section of a vehicle and coupled in a widthwise direction of the vehicle to a front of an opening section which is selectively opened and closed by a sunroof glass, and stored in a front frame, comprising:
    a deflector gate formed penetrating the front frame in the widthwise direction of the vehicle between a rainwater drainage section formed in the front frame and a ceiling weather strip;
    a first deflector which is stored inside the front frame to be moved up and down through the deflector gate and projectable outside of the opening section;
    a second deflector, an upper part of which is rotatably connected to a hinge joint located at a bottom of the first deflector and which is projectable outside of the opening section according to a movement of the first deflector; and
    a pair of deflector arms having:
        a rear end portion of which is rotatably coupled to a pair of side frames to be connected to sides of the opening section; and
        a front end portion of which is coupled to both sides of the first deflector to move the first deflector up and down,
        wherein the second deflector is stored in a folded manner by the hinge joint when the second deflector is stored inside the front frame together with the first deflector.

2. The folding type sunroof deflector structure according to claim 1, further comprising:
    a pair of guide bodies coupled to the pair of side frames, respectively;
    a guide hole formed through sides of the guide bodies in a forward and backward direction; and
    a slider coupled to a lower end of the second deflector and accommodated in the guide hole to be slid,
    wherein the second deflector is folded toward the first deflector as the slider slides in a rearward direction along the guide hole.

3. The folding type sunroof deflector structure according to claim 2, wherein an end of the guide hole is curved smoothly upward in an 'L'-shape configuration.

4. The folding type sunroof deflector structure according to claim 1, further comprising:
    a deflector weather strip which is coupled in the widthwise direction of the vehicle to a tip of the front frame positioned at front of the first deflector and the second deflector, thereby preventing a wind from entering in between the front frame and the first deflector and the second deflector.

5. The folding type sunroof deflector structure according to claim 1, further comprising:
   a plurality of deflector holes being formed through the first deflector in a horizontal direction, thereby minimizing wind noise generated during a high speed driving.

6. The folding type sunroof deflector structure according to claim 1, wherein the first deflector and the second deflector are hard-type deflectors formed from one of plastic, steel, and aluminum.

\* \* \* \* \*